(12) United States Patent
Spuller et al.

(10) Patent No.: US 9,649,800 B2
(45) Date of Patent: May 16, 2017

(54) MODULAR SIDE GATING NOZZLE AND MOLD

(71) Applicant: Otto Manner Innovation GmbH, Bahlingen (DE)

(72) Inventors: Swen Spuller, Forchheim (DE); Marco Herdel, Ihringen (DE)

(73) Assignee: OTTO MÄNNER INNOVATION GMBH, Bahlingen (DE)

( * ) Notice: Subject to any disclaimer, the term of this patent is extended or adjusted under 35 U.S.C. 154(b) by 0 days.

(21) Appl. No.: 14/750,673

(22) Filed: Jun. 25, 2015

(65) Prior Publication Data
US 2015/0375436 A1 Dec. 31, 2015

(30) Foreign Application Priority Data

Jun. 25, 2014 (DE) .................... 10 2014 009 437 U (51) Int. Cl.
*B29C 45/20* (2006.01)
*B29C 45/74* (2006.01)
(Continued)

(52) U.S. Cl.
CPC .......... *B29C 45/74* (2013.01); *B29C 45/2735* (2013.01); *B29C 45/2727* (2013.01); *B29C 2045/2775* (2013.01); *B29L 2031/757* (2013.01)

(58) Field of Classification Search
CPC ........ B29C 2045/2775; B29C 45/2727; B29C 45/2735
(Continued)

(56) References Cited

U.S. PATENT DOCUMENTS 4,622,001 A * 11/1986 Bright ................. B29C 45/7312
425/549
5,536,165 A 7/1996 Gellert
(Continued)

FOREIGN PATENT DOCUMENTS

DE 10 2009 037 343 A1 2/2011
EP 2 228 193 B1 9/2010
(Continued)

OTHER PUBLICATIONS

International Search Report in Application No. PCT/EP2015/064466 dated Sep. 22, 2015.

*Primary Examiner* — Jill Heitbrink
(74) *Attorney, Agent, or Firm* — McAndrews, Held & Malloy, Ltd.

(57) ABSTRACT

A hot runner injection molding apparatus to manufacture molded parts with a manifold having an inlet melt channel and a plurality of outlet melt channels, a plurality of injection molding cavities and a plurality of side gating nozzles coupled to the outlet melt channels and to the injection molding cavities. Each nozzle has a nozzle flange segment including a first melt channel disposed along a first axis and each side gating nozzle further includes a separate and removable nozzle head segment that is coupled to the flange segment via a sliding connector element that provides for an axial movement of the nozzle head segment or of the nozzle flange segment. Each nozzle head segment retains at least two nozzle tips that extend at least partially outside an outer surface of the nozzle head segment and each nozzle tip is surrounded by a nozzle seal element.

15 Claims, 10 Drawing Sheets (51) Int. Cl.
*B29L 31/00* (2006.01)
*B29C 45/27* (2006.01)

(58) Field of Classification Search
USPC .................................................. 425/572, 552
See application file for complete search history.

(56) References Cited

U.S. PATENT DOCUMENTS

| | | | |
|---|---|---|---|
| 5,843,361 A | 12/1998 | Gellert | |
| 7,303,384 B2 * | 12/2007 | Schreck | B29C 45/2735 425/192 R |
| 7,396,226 B2 * | 7/2008 | Fairy | B29C 45/27 425/549 |
| RE40,584 E | 11/2008 | Babin | |
| 7,547,208 B2 * | 6/2009 | Babin | B29C 45/2735 425/562 |
| 7,658,606 B2 * | 2/2010 | Klobucar | B29C 45/2735 264/328.9 |
| RE41,536 E | 8/2010 | Hagelstein et al. | |
| 7,794,228 B2 * | 9/2010 | Catoen | B29C 45/2735 264/328.15 |
| 8,066,505 B2 * | 11/2011 | Gunther | B29C 45/2735 425/549 |
| 8,202,082 B2 * | 6/2012 | Catoen | B29C 45/2735 425/572 |
| 8,206,145 B2 * | 6/2012 | Catoen | B29C 45/2735 264/328.15 |
| 8,210,842 B2 * | 7/2012 | Catoen | B29C 45/2735 264/328.15 |
| 8,282,387 B2 * | 10/2012 | Braun | B29C 45/2735 264/328.15 |
| 8,475,155 B2 * | 7/2013 | Catoen | B29C 45/2735 425/549 |
| 8,475,158 B2 * | 7/2013 | Fairy | B29C 45/2725 425/570 |
| 8,821,151 B2 * | 9/2014 | Overfield | B29C 45/2735 264/328.8 |
| 8,899,961 B2 * | 12/2014 | Esser | B29C 45/2737 264/328.15 |
| 8,899,964 B2 * | 12/2014 | Babin | B29C 45/22 264/328.8 |
| 8,932,046 B2 * | 1/2015 | Tabassi | B29C 45/076 425/567 |
| 9,227,351 B2 * | 1/2016 | Tabassi | B29C 45/2735 |
| 2005/0019444 A1 | 1/2005 | Sicilia et al. | |
| 2005/0067510 A1 | 3/2005 | Schreck | |
| 2005/0147713 A1 | 7/2005 | Hagelstein et al. | |
| 2005/0196486 A1 | 9/2005 | Babin et al. | |
| 2008/0069919 A1 | 3/2008 | Babin et al. | |
| 2008/0279978 A1 | 11/2008 | Babin et al. | |
| 2009/0051080 A1 | 2/2009 | Babin et al. | |
| 2009/0269430 A1 | 10/2009 | Catoen | |
| 2010/0183762 A1 | 7/2010 | Babin | |
| 2010/0215791 A1 | 8/2010 | Catoen | |
| 2011/0033570 A1 | 2/2011 | Braun | |
| 2011/0233238 A1 | 9/2011 | Catoen | |
| 2011/0240687 A1 | 10/2011 | Catoen | |
| 2012/0263823 A1 | 10/2012 | Catoen | |
| 2013/0056562 A1 | 3/2013 | Overfield et al. | |

FOREIGN PATENT DOCUMENTS

| | | |
|---|---|---|
| EP | 2 314 438 B1 | 4/2011 |
| WO | WO2009124865 A1 | 10/2009 |

\* cited by examiner

MODULAR SIDE GATING NOZZLE AND MOLD

CROSS-REFERENCE TO RELATED APPLICATIONS

This application claims benefit of priority from German (DE) Patent Application No. 10 2014 009 437.5, filed Jun. 25, 2014, which is hereby incorporated by reference in its entirety herein.

FIELD

This invention is related to a hot runner injection molding apparatus and methods of injection molding. More specifically, this invention is related to a side, or edge gating hot runner nozzle and cooperating mold cavities that together form a modular and removable assembly. Also this invention is related to a method of assembling, disassembling and servicing a side gated hot runner nozzle and cooperating mold cavities.

BACKGROUND

Hot runner injection molding systems and methods of injection molding using hot runner injection molding systems are known.

Side gating or edge gating hot runner injection molding systems and methods of injection molding using side gating or edge gating hot runner injection molding systems are also known. If no valve pin is used to control the flow of a molten material into the cavity, the side gating nozzles are called open or thermal gating nozzles.

There are known designs of open hot runner side gating molding systems, where the nozzle tips are sealed and retained at each mold gate area. If the seals protrude via a tight fit (or equivalent) at least partially into a mold section adjacent the mold gates, there is a need to decouple the seals and the tips to allow for an easy, fast and secure assembling, disassembling and servicing of the side gated hot runner nozzle and its components.

These known open side gating hot runner systems where limited servicing or assembling-disassembling is provided still have important limitations. These limitations need to be overcome in order to further improve the assembling, disassembling and servicing a side gated hot runner nozzle but without limiting or reducing the performance of the entire hot runner system.

SUMMARY

To overcome limitations of the prior art, a hot runner injection molding apparatus to manufacture molded parts according to the invention comprises a manifold has an inlet melt channel and a plurality of outlet melt channels, a plurality of injection molding cavities and a plurality of side gating nozzles coupled to the outlet melt channels and to the injection molding cavities. Each nozzle has a nozzle flange segment including a first melt channel disposed along a first axis and each side gating nozzle further includes a separate and removable nozzle head segment that is coupled to the flange segment via a sliding connector element that provides for an axial movement of the nozzle head segment or of the nozzle flange segment. Each nozzle head segment retains at least two nozzle tips that extend at least partially outside an outer surface of the nozzle head segment and each nozzle tip is surrounded by a nozzle seal element. Thus, the apparatus comprises a structure with a two-part nozzle which prevents thermal expansion difficulties and provides for simplified servicing.

In a development of the hot runner injection molding apparatus the nozzle head segment includes at least two auxiliary melt channel portions, each auxiliary melt channel portion has a second axis which is angled with respect to the first axis. A nozzle with auxiliary melt channel portion having an angled axis provides for the manufacture of molded parts requiring side gating.

In a further development of the hot runner injection molding apparatus each injection molding cavity is located in a molding cavity insert, which is removable together with the nozzle head segment and the nozzle tips while the nozzle flange segment is maintained in the initial operation position in the injection molding apparatus. This structure of the injection molding apparatus provides for easy disassembly of the nozzle head segment and therefore also for easy access to the nozzle tips in particular in case of malfunction and required servicing.

In a further development of the hot runner injection molding apparatus each injection molding cavity is positioned along a third axis which is parallel to the first axis. In particular, the third axis is also parallel to the direction of the opening movement of the mold. Each molding cavity insert has a lateral wall section which is defined between an inner surface and an outer surface of the molding cavity insert. The lateral wall section further includes a mold gate orifice positioned adjacent a nozzle tip. The lateral wall section includes a sealing section to receive and locate the nozzle seal element. This design serves to provide a good support of the nozzle tip at the mold gate orifice to prevent in operation a leakage of molten material during the filling of the cavity.

In a further development of the hot runner injection molding apparatus each molding cavity insert has a continuous lateral wall section defined between a continuous inner surface and a continuous outer surface to prevent in operation a leakage of a molten material during the filling of the cavity. There is a risk of leakage at discontinuous joint positions of multi-piece molding cavity inserts. In addition there are undesired joint marks at the molded parts at discontinuous positions.

In a further development of the hot runner injection molding apparatus each injection molding cavity defines the full shape of the molded part in a single injection step. Such an embodiment also helps to prevent undesired marks at the molded parts.

In a further development of the hot runner injection molding apparatus each molding cavity is surrounded by liquid cooling channels. Those cooling channels enable a fast and uniform cooling of the molded part to achieve short molding cycles.

In a further development the hot runner injection molding apparatus comprises at least one removable mold cavity retainer. Each mold cavity retainer includes at least two openings to receive and retain a removable molding cavity insert. An embodiment having a mold cavity retainer enables an easy assembly and disassembly of the nozzle head and nozzle tips.

In a further development of the hot runner injection molding apparatus the nozzle head segment and the nozzle tips together with the corresponding molding cavities and the corresponding molding cavity inserts form an assembly of hot melt and cold melt elements that are together removable as an assembly unit. The use of assembly units simplifies the servicing of the injection molding apparatus.

According to an embodiment, an open side gating hot runner nozzle includes a nozzle head that retains at least two nozzle tips and two nozzle seals that are coupled, retained, fixed or blocked at the mold gate area and they protrude at least partially into a portion of the mold adjacent the mold gate area. This sealing engagement prevents any axial thermal expansion movement of the nozzle tips and nozzle seals along an axis of the hot runner nozzle that defines the main path of a molten material flowing through the melt channel of the hot runner nozzle body. After that the melt flow branches under certain angles, such 90° or 60° and flows towards the tips and towards the mold gates. The tips and seals are thus retained in operation to prevent the leakage of the molten material around and under the seals.

According to an embodiment, the steps of assembling, disassembling and servicing a side gated hot runner nozzle and its components is achieved by creating a removable and modular assembly comprising some or all of the following items:

a) a removable portion of the hot runner nozzle defined as the nozzle head that retains the nozzle tips and nozzle seals,
b) at least two removable nozzle tips and two nozzle tip seals coupled to the nozzle head,
c) at least two removable mold cavities inserts with mold cavities located therein that define the entire outer portion of molded parts and
d) removable mold cavity retainers that provide support for the minimum of two mold cavities, with the additional provision that e) a telescopic connection or a telescopic linkage having a melt channel is provided between the nozzle head and a nozzle flange segment. This telescopic connection is designed to allow for a) the axial thermal expansion of the nozzle head and the nozzle flange segment in operation, considering that the nozzle head is locked at the mold gate by the nozzle seals and b) for the easy decoupling of the nozzle head from the nozzle flange segment.

BRIEF DESCRIPTION OF SEVERAL VIEWS OF THE DRAWINGS

Further advantages, features and applications of the present invention will become apparent from the following description taken in conjunction with the figures.

DETAILED DESCRIPTION

Figure 1:
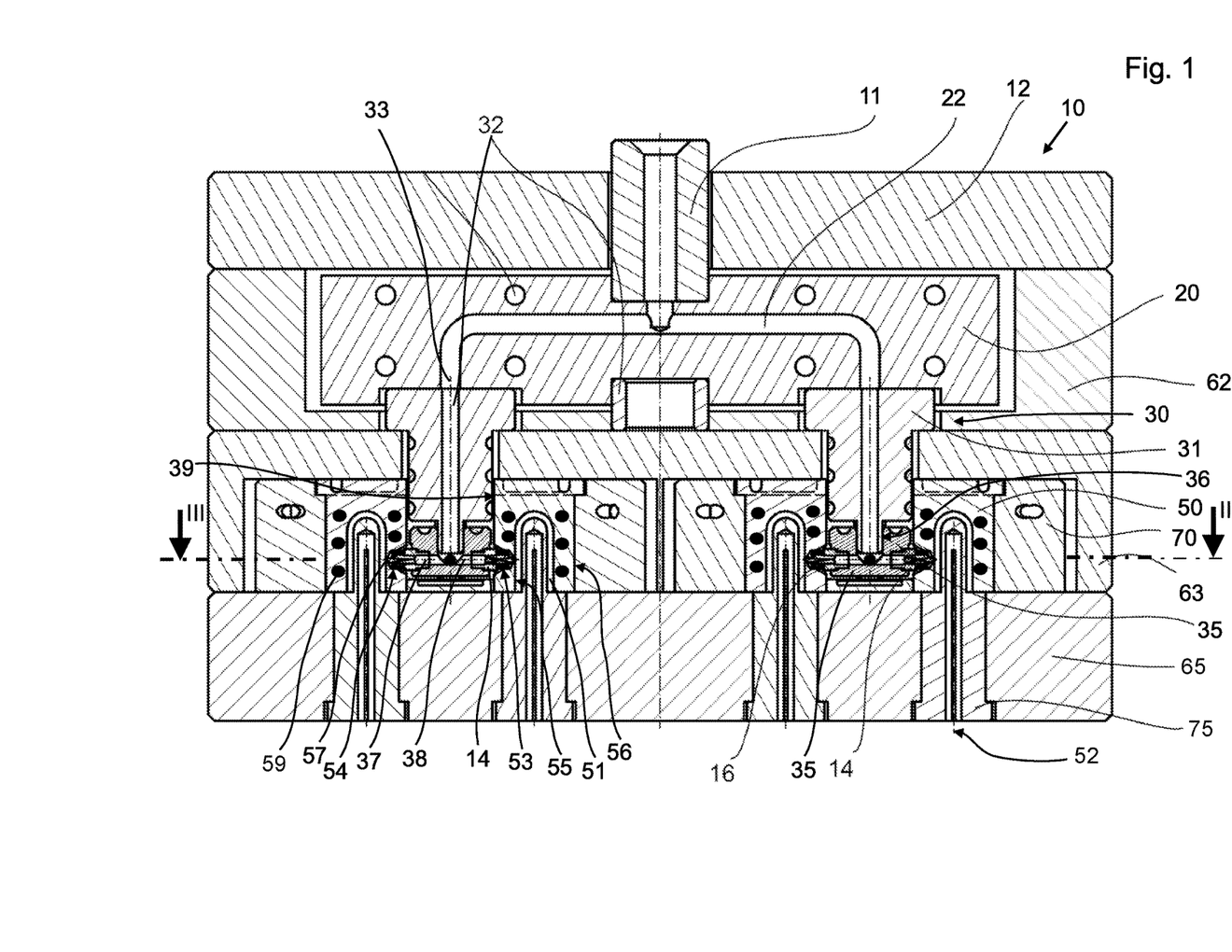
FIG. 1 shows a first cross section of the side gated hot runner apparatus according to an embodiment of the invention.

Reference is made to FIG. 1 which shows a side gating or edge gating hot runner injection molding apparatus 10 in accordance with an embodiment of the present invention. The apparatus 10 includes a manifold 20 which is located within a first mold plate 62 and a plurality of side gating nozzles 30 for side gating at least two separate molding cavities 51. Molten material (melt) flows from the machine nozzle 11, which penetrates the machine plate 12, into the inlet melt channel 21 and through the outlet melt channels 22 of the manifold, through the nozzles 30, and into molding cavities 51 in molding cavity inserts 50.

Each nozzle 30 has a nozzle flange segment 31 which in one axial direction of the nozzle flange segment 31 fits at the manifold 20 in a way to allow molten material flow from the outlet melt channels 22 into the first melt channel 32 disposed along a first axis 33 in the nozzle flange segment 31. In the opposite axial direction the nozzle flange segment 31 penetrates the second mold plate 63 and is supported with its flange at the second mold plate 63.

Each side gating nozzle 30 includes a separate and removable nozzle head segment 35 that is coupled to the flange segment 31 via a sliding connector element 36 that provides for an axial movement of the nozzle head segment 35 or of the nozzle flange segment 31 to avoid any difficulties due to thermal expansion and to allow the disassembly of nozzle head segment 35 and nozzle flange segment 31.

Each nozzle head segment retains at least two nozzle tips 14 which are arranged in lateral openings of the nozzle head segment 35. According to the invention the number of nozzle tips 14 arranged at the nozzle head segment is not limited to two nozzle tips 14. Depending on the size of the nozzle head segment 35 and the nozzle tips 14, there can be 4, 6, 8, 10, 12 or even more nozzle tips 14 arranged in lateral openings of the at the nozzle head segment 35. It is also possible to arrange an uneven number of nozzle tips 14 at the nozzle head segment 35 as for example 3, 5, 7, 9 or more nozzle tips 14. The nozzle tips 14 extend partially outside of the outer surface 39 of the nozzle head segment 35.

FIG. 1 shows two auxiliary melt channel portions 37 of the nozzle head segment 35. The auxiliary melt channel portions 37 are disposed along a second axis 38 which is angled with respect to the first axis 33.

The injection molding cavities 51 are disposed in removable arranged molding cavity inserts 50. For disassembling the injection molding apparatus, the molding cavity inserts 50 are removable together with the nozzle head segment 35 and the nozzle tips 14 while the nozzle flange segment 31 stays supported with its flange at the second mold plate 63 and thus unaffected in the initial operation position in the mold plates 62, 63 within the injection molding apparatus 10.

The injection molding cavities 51 are positioned along a third axis 52 which is parallel to the first axis 33. The molding cavity inserts 50 have lateral wall sections 53 defined between an inner surface 55 and an outer surface 56. The lateral wall section 53 includes a mold gate orifice 57 which is positioned adjacent a nozzle tip 14. Each nozzle tip 14 is surrounded by a nozzle seal element 16. The lateral wall section 53 receives and locates the nozzle seal element 16 which serves for sealing the nozzle at the sealing section 54. As the molding cavity insert 50 shown in FIG. 1 is one-piece, each molding cavity insert 50 has a continuous lateral wall section 53. The injection molding cavity inserts 50 comprise liquid cooling channels 59 which encircle the molding cavities 51 to allow for a tempering of the mold cavities 51.

The injection molding apparatus 10 comprises at least one removable mold cavity retainer 70. In FIG. 1, two mold cavity retainers 70 are shown. In FIG. 1, each mold cavity retainer 70 shows two openings 71 within which a removable molding cavity insert 50 is received. Due to the design of the elements of the injection molding apparatus 10, the nozzle head segment 35 and the nozzle tips 14 are removable as an assembly unit together with the corresponding molding cavities 51 and the corresponding molding cavity inserts 50. These elements form an assembly of hot melt and cold melt elements.

The injection molding apparatus 10 may comprise a third mold plate 65 that may support one or more mold cores 75.

Figure 2:
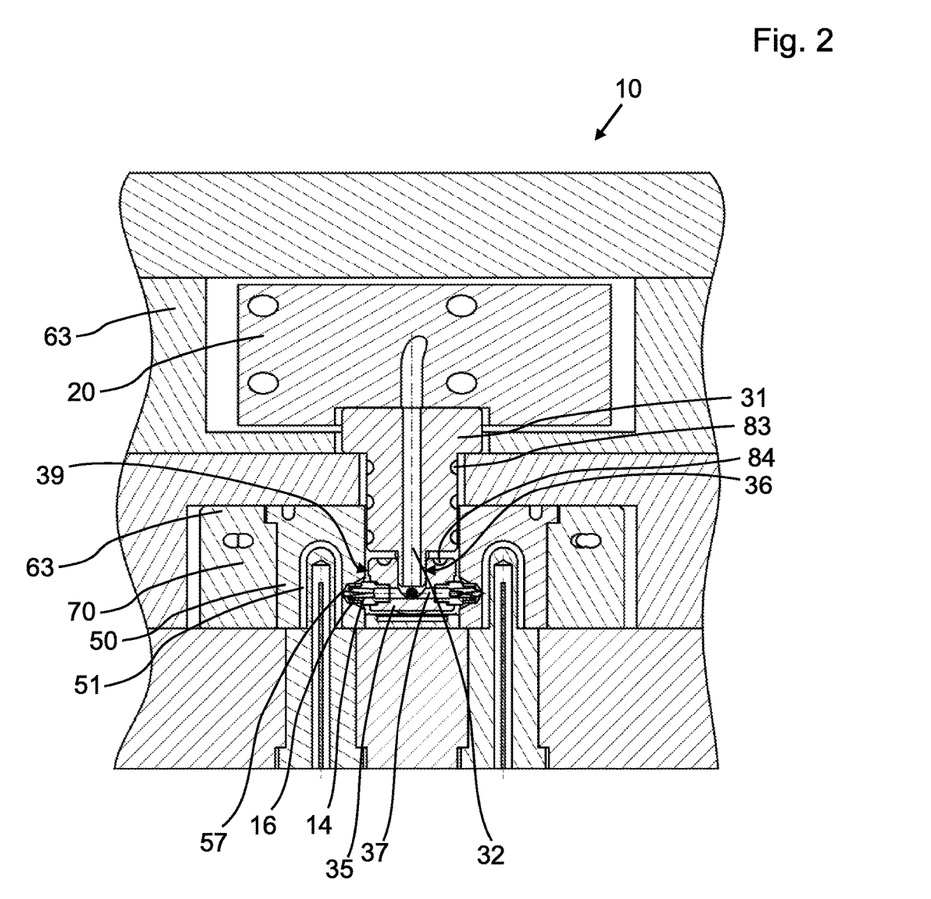
FIG. 2 shows a second partial cross section of the side gated hot runner apparatus shown in FIG. 1 according to an embodiment of the invention.

FIG. 2 shows a second partial cross section of the side gated hot runner apparatus shown in FIG. 1. The same reference numerals designate the same elements as in FIG. 1. As shown in FIG. 2 from another position, the nozzle head segment 35 makes a sealing contact with the manifold 20 and a sealing contact with the molding cavity inserts 50 provided by nozzle tips 14 and nozzle seal elements 16.

Figure 3:
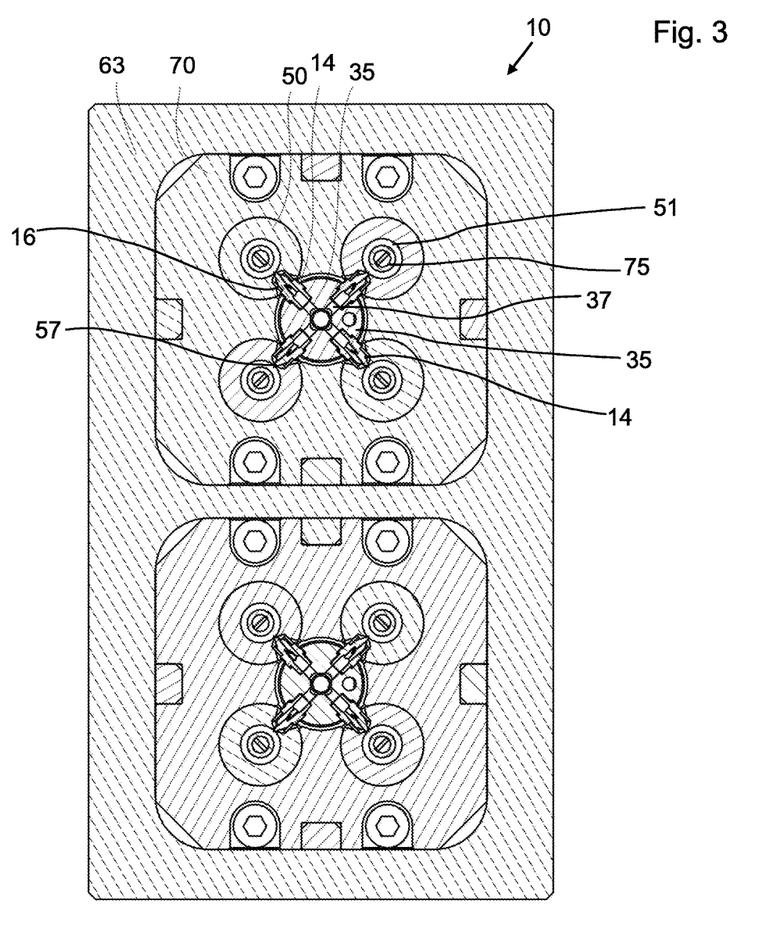
FIG. 3 shows the partial cross section III-III through the bottom side of the hot runner apparatus shown in FIGS. 1 and 2 according to an embodiment of the invention.
Figure 4:
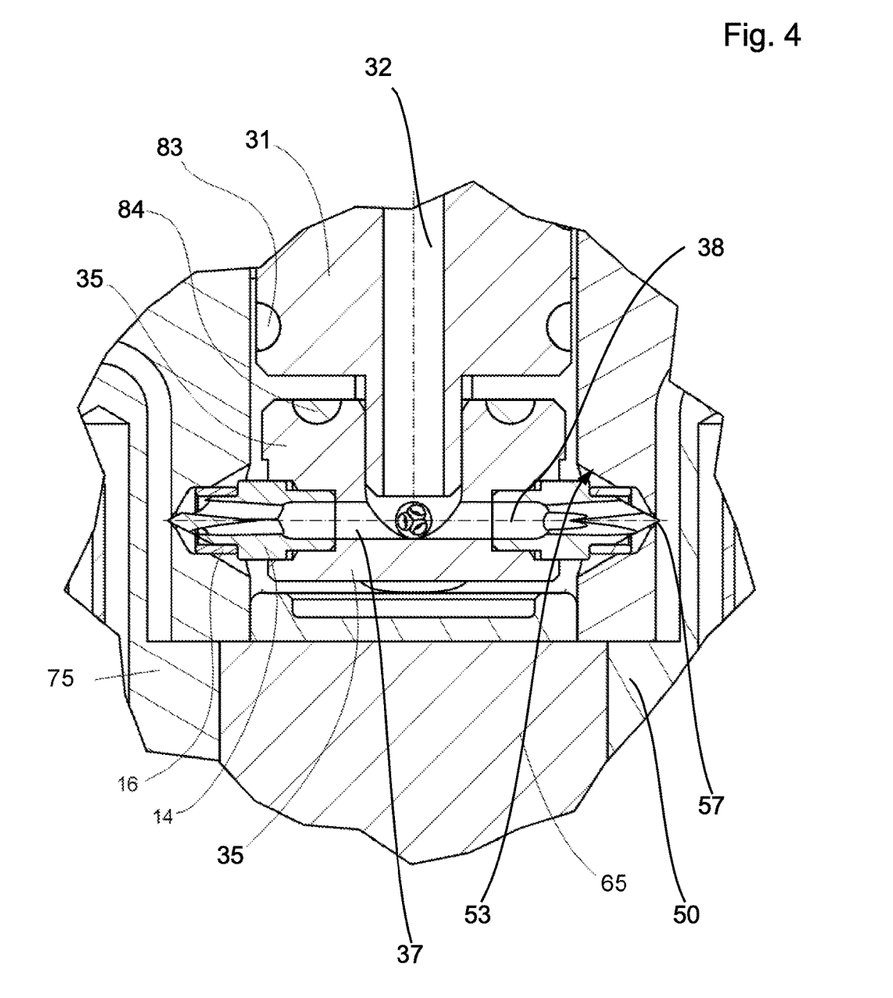
FIG. 4 shows in cross section a lower detail of the side gated hot runner apparatus shown in FIGS. 1 and 2 according to an embodiment of the invention.

Because the nozzle 30 is located in a first fix position by the nozzle flange segment 31 with respect to the manifold 20 and in a second fix lower position by the nozzle tips 14 and seal elements 16 connected to the nozzle head segment 35, in case of an axial thermal expansion the nozzle tips 14 and nozzle seal elements 16, the nozzle 30 may be damaged due to a high stress. For this reason and to avoid problems the nozzle 30 is split in two parts that slide relative to the other, as is shown in FIG. 3 and FIG. 4. One part is the nozzle flange segment 31 and the other part is the nozzle head segment 35 that retains the nozzle tips 14 and nozzle seal elements 16.

FIG. 3 shows the partial cross section III-III through the bottom side of the hot runner apparatus shown in FIGS. 1 and 2. The same reference numerals designate the same elements as in FIGS. 1 and 2. The mold cavity retainer 70 is disposed within the second mold plate 63. The mold cavity retainer 70 comprises four openings 71 evenly distributed around the nozzle head segment 35 within which molding cavity inserts 50 are received. Also the nozzle head segment 35 comprises four nozzle tips 14 which are evenly distributed around the nozzle head segment 35. The nozzle seal elements 16 are received in lateral wall sections 53 of the molding cavity inserts 50.

FIG. 4 shows in cross section a detail of the side gated hot runner apparatus 10 shown in FIGS. 1 and 2. The same reference numerals designate the same elements as in FIGS. 1 and 2.

FIG. 4 shows a nozzle head segment 35 with two nozzle tips 14 which are arranged in lateral openings of the nozzle head segment 35. Each nozzle tip 14 comprises a nozzle seal element 16 which is received in a lateral wall section 53 of the molding cavity insert 50. The lateral wall section 53 includes a mold gate orifice 57 which is positioned adjacent the nozzle tip 14. The lateral wall section 53 receives and locates the nozzle seal element 16 which serves for sealing the nozzle at the sealing section 54. The nozzle head segment 35 comprises two auxiliary melt channel portions 37 of the nozzle head segment 35. The auxiliary melt channel portions 37 are disposed along a second axis 38.

Also heater 83 for tempering the nozzle flange segment 31 and heater 84 for tempering the nozzle head 35 are shown in FIG. 4.

As shown in FIG. 3 and FIG. 4 the nozzle tips 14 and nozzle seal elements 16 protrude into an area of the mold gate to ensure an efficient seal of the tips and prevent the molten material to leak and pass the nozzle seal elements 16.

If a nozzle tip 14 or nozzle seal element 16 is damaged and needs to be removed from the nozzle 30, the invention provides a modular design approach.

Figure 5:
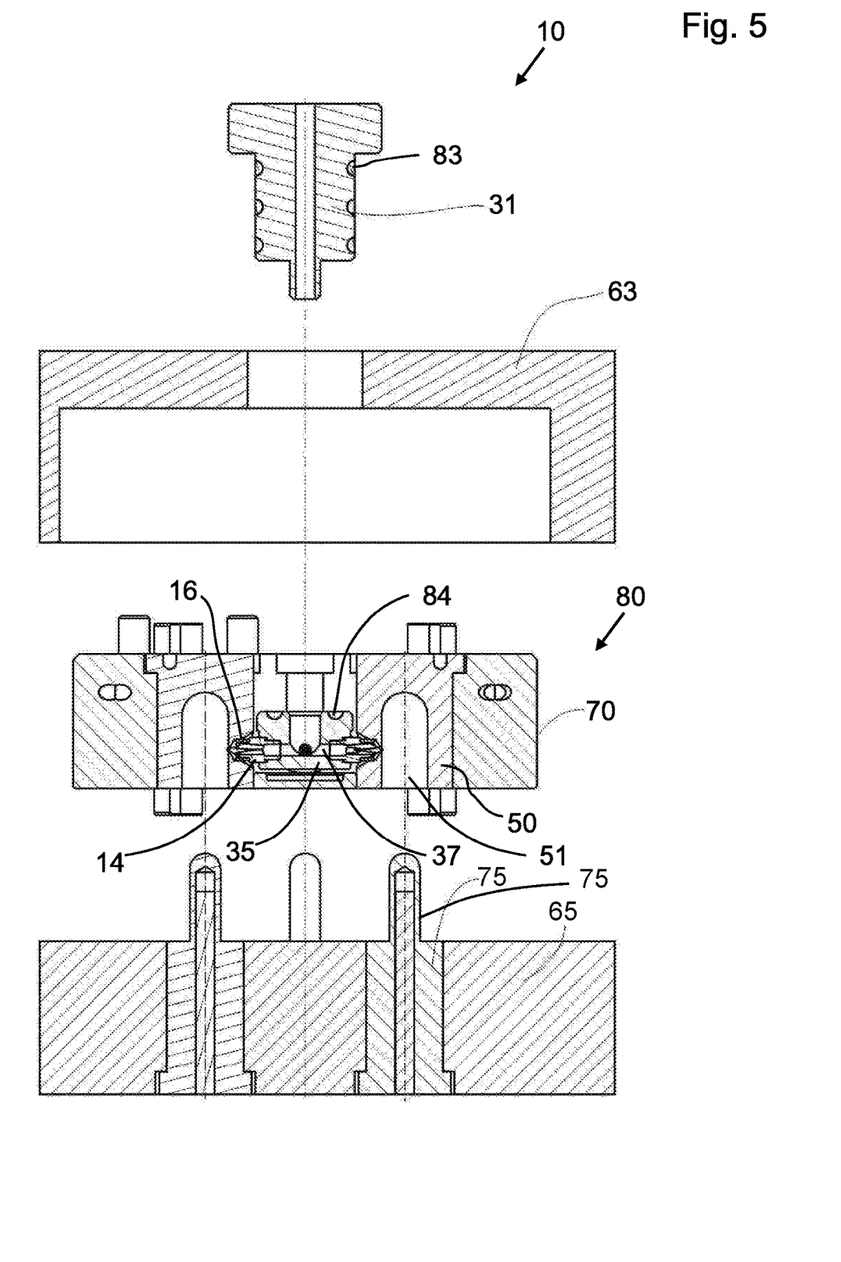
FIG. 5 shows a first blow-up cross section of a portion of the side gated hot runner apparatus shown in FIGS. 1 and 2 with emphasis on the removable and modular components of the apparatus, according to an embodiment of the invention.
Figure 6:
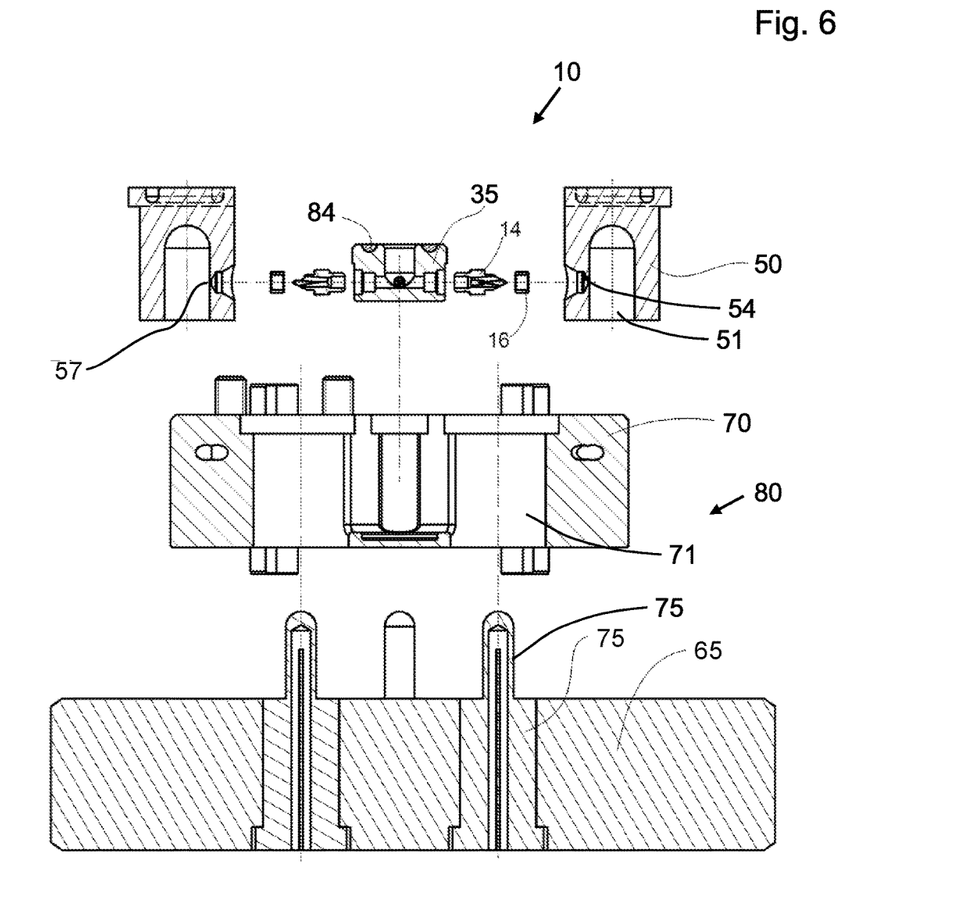
FIG. 6 shows a second blow-up cross section of a portion of the side gated hot runner apparatus shown in FIGS. 1 and 2 with more emphasis on the removable and modular components of the apparatus, according to an embodiment of the invention.

FIG. 5 shows a first blow-up cross section of a portion of the side gated hot runner apparatus shown in FIGS. 1 and 2 with emphasis on the removable and modular components of the apparatus. FIG. 6 shows a second blow-up cross section of a portion of the side gated hot runner apparatus shown in FIGS. 1 and 2 with more emphasis on the removable and modular components of the apparatus. The same reference numerals designate the same elements as in the FIGS. 1 to 4.

As shown in FIGS. 5 and 6 several components of the nozzle 30 and of the mold are removable and replaceable in an easy way that limits the down-time caused by the stop of production.

The two parts nozzle 30 allows for the nozzle flange segment 31 to be located in a fix position relative to the manifold 20 and a mold plate 63 while allowing the nozzle head segment 31 to be removed from the front when the mold is in a stationary open position for servicing.

Figure 7:
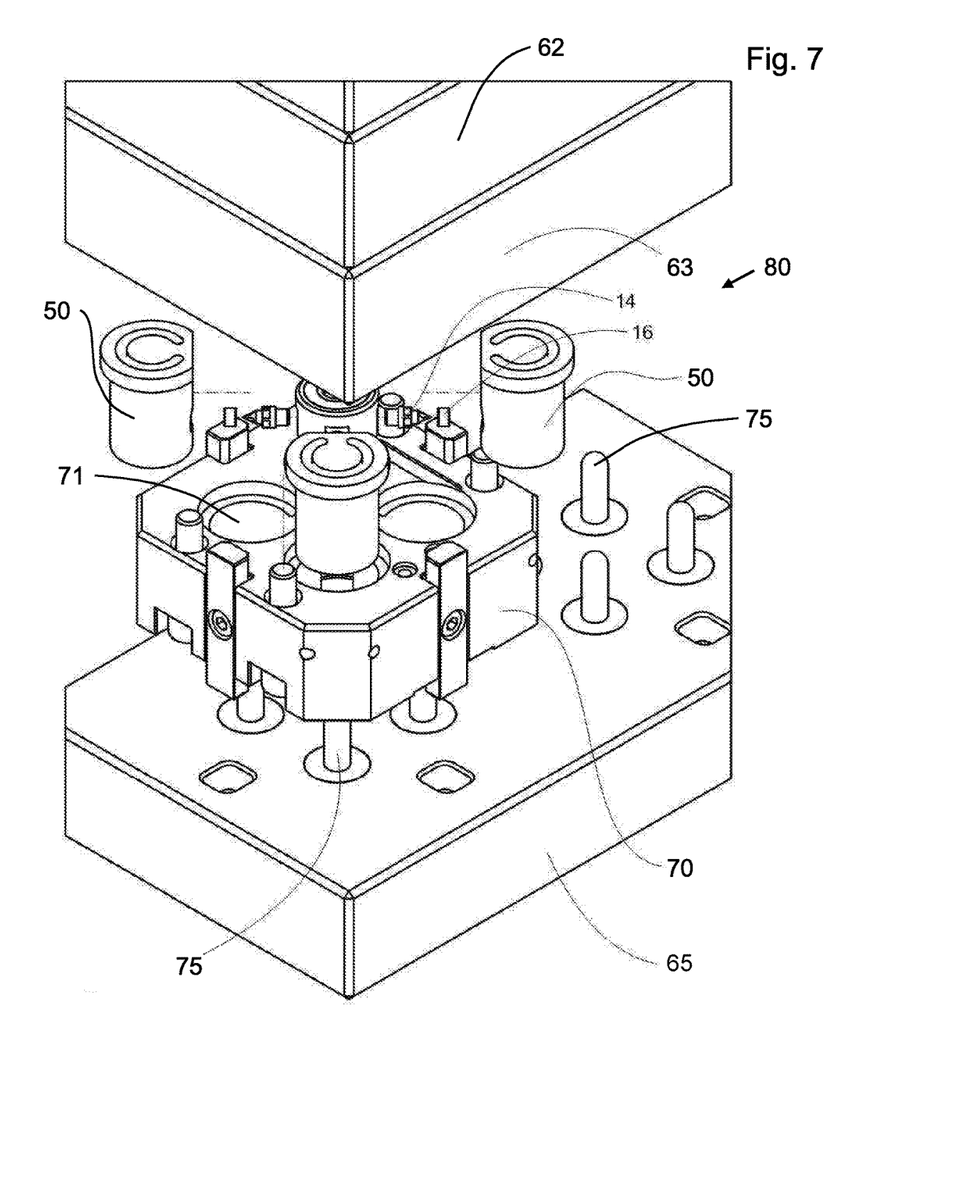
FIG. 7 shows a third blow-up 3D view of a portion of the side gated hot runner apparatus shown in FIGS. 1 and 2 with additional emphasis on the removable and modular mold cavities retainers.

FIG. 7 shows a third blow-up 3D view of a portion of the side gated hot runner apparatus shown in FIGS. 1 and 2 with additional emphasis on the removable and modular mold cavities retainers. The same reference numerals designate the same elements as in the FIGS. 1 to 6.

As shown in FIGS. 3, 5, 6 and 7 the modular system is comprised of several mold cavity retainers 70 that include at least two openings 71 to locate at least two molding cavity inserts 50 in a tight, yet removable way. In FIG. 7 there is a 3D view of a mold cavity retainer 70 having four openings 71 to locate four molding cavity inserts 50 in conjunction and cooperation with four mold cores 75.

As further shown in FIGS. 5 and 6, when the mold is in an open stationary position for service, the molding cavity inserts 50 can be removed from the second mold plate 63 together with at least two molding cavity inserts 50 and with the nozzle head segment 35 including nozzle tips 14 or nozzle seal elements 16.

Figure 8:
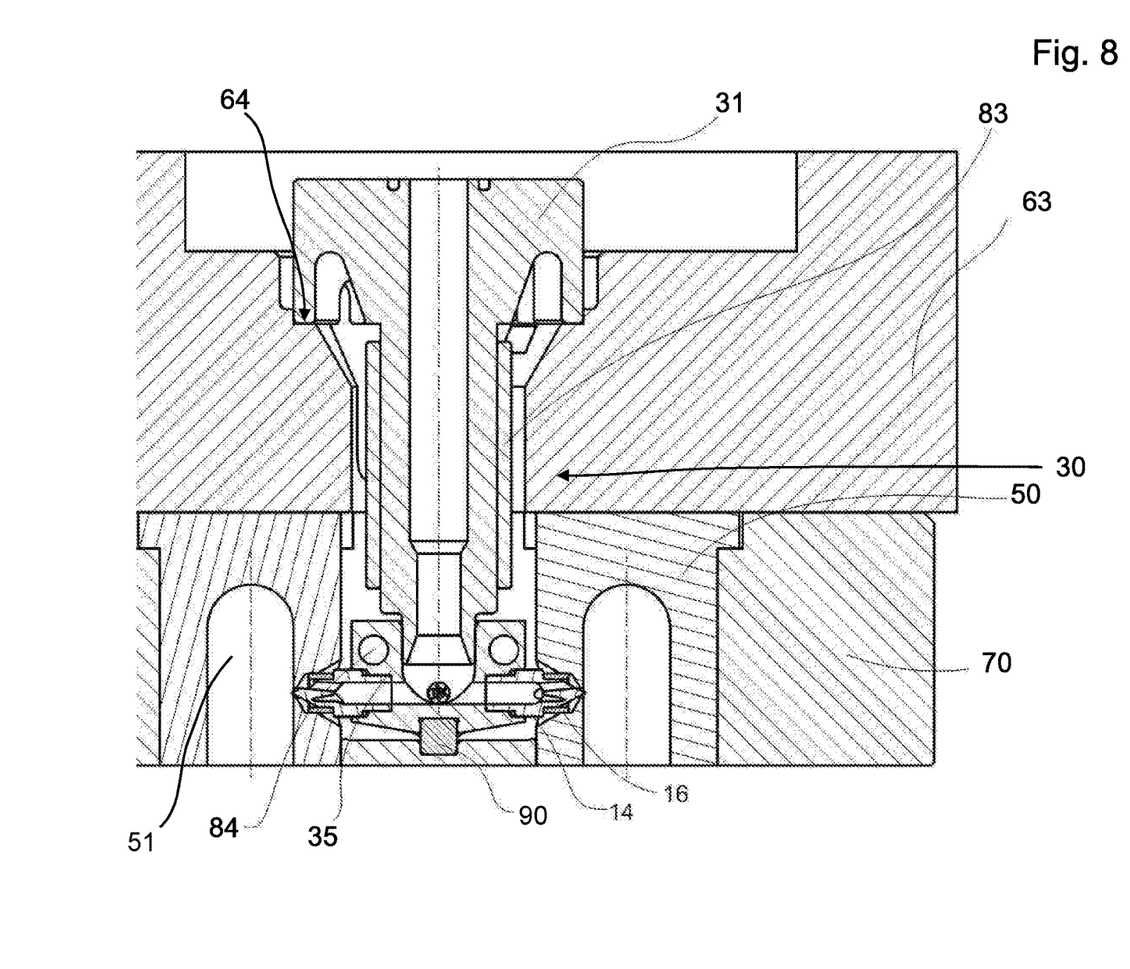
FIG. 8 shows a detailed cross section of another embodiment of the invention.
Figure 9:
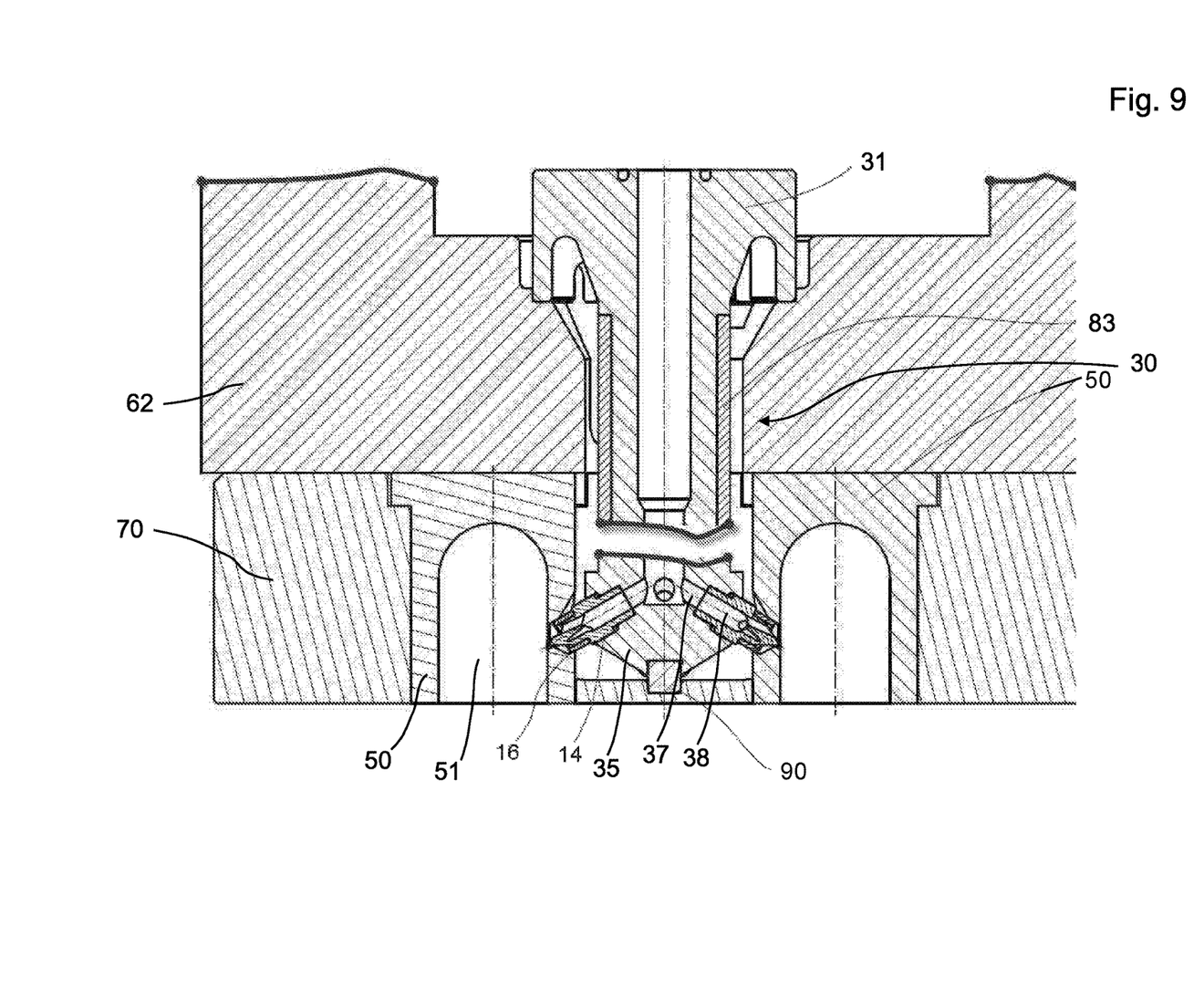
FIG. 9 shows a detailed cross section of another embodiment of the invention where branching melt channels on the nozzle head make a different angle than the 90° angle of the melt channels in the nozzle head shown in FIG. 4 and FIG. 8.
Figure 10:
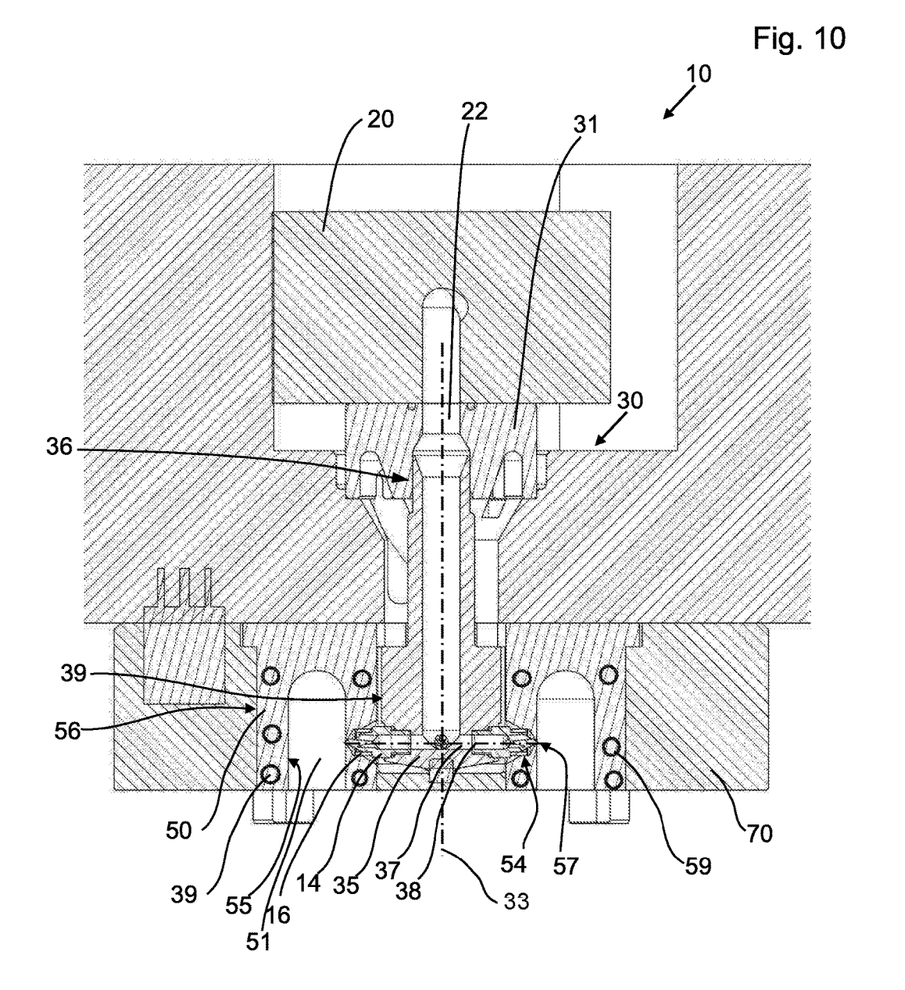
FIG. 10 shows a detailed cross section of another embodiment of the invention with the telescopic connection moved closer to the nozzle flange.

FIG. 8 shows a detailed cross section of another embodiment of the invention and also FIG. 9 shows a detailed cross section of another embodiment of the invention where branching melt channels on the nozzle head make a different angle than the 90° angle of the melt channels in the nozzle head shown in FIG. 4 and FIG. 8. FIG. 10 shows a detailed cross section of another embodiment of the invention with the telescopic connection moved closer to the nozzle flange. The same reference numerals designate the same elements as in the FIGS. 1 to 7.

The side gating nozzle 30 of FIG. 8 differs from the side gating nozzles 30 of the FIGS. 1 to 7 in the use of a different heater 83 which is easier to service. Also the flange of the nozzle flange segment 31 of the nozzle 30 is designed in a different way for being received in a recessed support 64 of the second mold plate 63. A third variation in comparison to the preceding embodiments of FIGS. 1 to 7 is the larger melt volume within the nozzle head segment 35 and the disposition of the heater 84 within the nozzle head segment 35. The side gating nozzle 30 may include a space/support 90.

The side gating nozzle 30 of FIG. 9 differs from the side gating nozzle 30 of FIG. 8 in that the melt channel portion 37 on the nozzle head segment 35 has an angle deviating from 90 degrees as is shown in the nozzle head segments 35 of FIG. 8.

The side gating nozzle 30 of FIG. 10 differs from the side gating nozzle 30 of FIG. 8 in a different design of the nozzle flange segment 31 and the nozzle head segment 35. The nozzle head segment 35 of FIG. 10 extends more along the first axis 33 in the direction to the manifold 20. A different designed nozzle flange segment 31 is situated within a recessed support 64 of the second mold plate 63. The nozzle head segment 35 is also coupled to the flange segment 31 via a sliding connector element 36. Different from the embodiment shown in FIG. 8. the sliding connector 36 is disposed within the nozzle head segment 35. As with the further embodiment, the sliding connector element 36 provides for an axial movement of the nozzle head segment 35 or of the nozzle flange segment 31 of FIG. 10, to avoid any difficulties due to thermal expansion and to allow the disassembly of nozzle head segment 35 and nozzle flange segment 31.

As already shown in FIG. 1, the injection molding cavity inserts 50 comprise liquid cooling channels 59 which encircle the molding cavities 51 to allow for a tempering of the mold cavities 51. Although liquid cooling channels 59 are not shown arranged at the injection molding cavity inserts 50 of FIGS. 2 to 9, it is also possible to arrange liquid cooling channels 59 within the injection molding cavity inserts 50 of the embodiments of FIGS. 2 to 9.

This modular assembly 80 is formed of a mold cavity retainer 70, several molding cavity inserts 50, a single nozzle head segment 35 having at least two nozzle tips 14 and nozzle seal elements 16. The modular assembly 80 allows for the assembly, disassembly and service of the injection molding apparatus 10 even though, as shown in FIGS. 3, 4, 8, 9 and 10, the nozzle tips 14 and nozzle seal elements 16 are locked into openings around the mold gate orifice 57.

As shown in FIG. 5, after the modular assembly 80 formed of a mold cavity retainer 70, several molding cavity inserts 50, a single nozzle head segment 35 having at least two tips 14 and nozzle seal elements 16 is removed from the corresponding mold plate 63, the mold cavity retainer 70, the nozzle head segment 35 with the tips 14 and nozzle seal elements 16 can be removed by axial sliding from the mold plate 63. After that the molding cavity inserts 50 can be released from the nozzle head segment 35 and nozzle tips 14 by lateral sliding. Next, the nozzle seal elements 16 and the nozzle tips 14 can be removed. In real life only one tip 14 or nozzle seal element 16 may need to be replaced, but the steps remain the same. The same steps but in reverse are used to assembly or to put back the nozzle head and the nozzle tips 14 in sealing contact with the mold gate orifices 57.

In some cases one heater is used for the nozzle flange segment, but as shown in FIGS. 2, 4 and 8 one heater 83 is used for the nozzle flange segment 31 sometimes including the nozzle flange and another heater 84 (or several heaters) are used for the nozzle head 35. For each heater, at least one thermocouple is used to measure the temperature during operation. The nozzle head heater 84 can be connected and disconnected in a fast way by using a heater quick connector.

For some applications and materials, the telescopic connection can be placed in the proximity of the nozzle flange, as shown in FIG. 10.

The invention claimed is:

1. A hot runner injection molding apparatus to manufacture molded parts comprising:
   a manifold having an inlet melt channel and a plurality of outlet melt channels;
   a plurality of injection molding cavities; and
   a plurality of side gating nozzles coupled to the outlet melt channels and to the injection molding cavities;
   wherein each side gating nozzle has
      a nozzle flange segment that penetrates a mold plate, that is supported by and fixed to the mold plate, and that includes a first melt channel disposed along a first axis,
      a separate and removable nozzle head segment that is removably coupled to the flange segment via a sliding connector element that provides for an axial movement of the nozzle head segment or of the nozzle flange segment, and
      at least one mold cavity retainer that retains one or more mold cavity inserts and the nozzle head segment, and that includes at least two openings to receive and retain a removable molding cavity insert;
   wherein the sliding connector element is disposed within the nozzle flange segment and extends into the removable nozzle head segment along the first axis,
   wherein each nozzle head segment is configured to be removed from the nozzle flange segment while the nozzle flange segment remains supported by and coupled to the mold plate and while the nozzle head segment remains retained by the mold cavity retainer,
   wherein each nozzle head segment retains at least two nozzle tips that extend at least partially outside an outer surface of the nozzle head segment, each nozzle tip being surrounded by a nozzle seal element,
   wherein each nozzle head segment is a single piece element configured to be axially moveable as a single unit together with the retained nozzle tips,
   wherein each nozzle tip is configured to be attached and removed from the corresponding nozzle head segment when the nozzle head segment is external to the side gating nozzle,
   wherein each injection molding cavity is located in a molding cavity insert having a continuous lateral wall section defined between a continuous inner surface and a continuous outer surface to prevent in operation a leakage of a molten material during the filling of the cavity,
   wherein each injection molding cavity defines the full shape of the molded part in a single injection step, and
   wherein each nozzle head segment and the retained nozzle tips together with the corresponding molding cavity and the corresponding molding cavity insert form an assembly of hot melt and cold melt elements that are together, along with each mold cavity retainer, removable as an assembly unit.

2. A hot runner injection molding apparatus according to claim 1, wherein
the nozzle head segment includes at least two auxiliary melt channel portions, each auxiliary melt channel portion has a second axis which is angled with respect to the first axis.

3. A hot runner injection molding apparatus according to claim 1, wherein
each injection molding cavity is positioned along a third axis which is parallel to the first axis, each molding cavity insert having a lateral wall section defined between an inner surface and an outer surface and the lateral wall section further includes a mold gate orifice positioned adjacent a nozzle tip and where the lateral wall section further includes a sealing section to receive and locate the nozzle seal element.

4. A hot runner injection molding apparatus according to claim 1, wherein
each molding cavity is surrounded by liquid cooling channels.

5. A hot runner injection molding apparatus according to claim 1, wherein the sliding connector element provides a telescopic connection between the nozzle head segment and the nozzle flange segment.

6. A hot runner injection molding apparatus according to claim 3, further comprising openings around the mold gate orifice.

7. A hot runner injection molding apparatus according to claim 6, wherein the nozzle tips and nozzle seal elements are locked into the openings around the mold gate orifice.

8. A hot runner injection molding apparatus according to claim 7, wherein the injection molding apparatus is configured to be able to be disassembled while the nozzle tips and nozzle seal elements are locked into the openings around the mold gate orifice.

9. A hot runner injection molding apparatus to manufacture molded parts comprising:
a manifold having an inlet melt channel and a plurality of outlet melt channels;
a plurality of injection molding cavities;
a plurality of removable molding cavity inserts, each removable molding cavity insert including a mold gate orifice and an adjacent lateral wall section; and
a plurality of side gating nozzles coupled to the outlet melt channels;
wherein each injection molding cavity is located in a removable molding cavity insert,
wherein the injection molding cavity inserts are arranged in one or more separate groups of injection molding cavity inserts,
wherein each side gating nozzle comprises a nozzle body segment having a flange segment seated on a mold plate, the nozzle body segment including a first melt channel disposed along a first axis, each side gating nozzle further including a separate and removable nozzle head segment that is removably coupled to the flange segment via a sliding connector element that provides for axial movement of the nozzle head segment relative to the nozzle flange segment,
wherein the sliding connector element is disposed within the flange segment and extends into the removable nozzle head segment along the first axis,
wherein each removable nozzle head segment is configured to be removed from the flange segment while the flange segment remains seated on the mold plate,
wherein each removable nozzle head segment is a single piece element that retains at least two nozzle tips that extend at least partially outside an outer surface of the nozzle head segment, each nozzle tip including a nozzle tip melt channel disposed along a second axis that is angled with respect to the first axis, each nozzle tip being further surrounded by a nozzle seal element, and
wherein the adjacent lateral wall section of the removable molding cavity insert has a sealing section that locates in a sealing position the nozzle seal element,
wherein each group of injection molding cavity inserts is removably positioned into a mold cavity retainer, the mold cavity retainer being further removably coupled to the mold plate,
wherein each nozzle head segment is configured to be coupled and decoupled from the nozzle body segment via a first translation along the first axis together with each of the nozzle tips locked at the mold gates, the mold cavity retainer, and the removable molding cavity inserts, and
wherein the nozzle tips and seals are configured to be coupled and decoupled from the nozzle head segment and from the sealing section via a second translation along the second axis when the nozzle head segment is external to the side gating nozzle.

10. The hot runner injection molding apparatus of claim 9, wherein each of the removable injection molding cavity inserts comprises one or more liquid cooling channels which encircle the molding cavities to allow for a tempering of the mold cavities.

11. The hot runner injection molding apparatus of claim 9, wherein the nozzle tips associated with each nozzle head segment are evenly distributed around the associated nozzle head segment.

12. The hot runner injection molding apparatus of claim 9, further comprising at least two mold cavity retainers, wherein at least two injection molding cavity inserts are removably positioned into each mold cavity retainer.

13. A hot runner injection molding apparatus to manufacture molded parts comprising:
a manifold having an inlet melt channel and a plurality of outlet melt channels;
a plurality of injection molding cavities;
a mold cavity retainer;
a plurality of molding cavity inserts; and
a plurality of side gating nozzles coupled to the outlet melt channels;
wherein each side gating nozzle comprises a nozzle flange segment removably coupled via a sliding connector element to a removable nozzle head segment;
wherein the nozzle flange segment penetrates a mold plate, is supported by and fixed to the mold plate, and includes a first melt channel disposed along a first axis,
wherein the sliding connector element is disposed within the nozzle flange segment and extends into the removable nozzle head segment along the first axis,
wherein the mold cavity retainer retains at least one of the mold cavity inserts and at least one removable nozzle head segment,
wherein the removable nozzle head segment is configured to be removed from the nozzle flange segment while the nozzle flange segment remains supported by and fixed to the mold plate, and while the nozzle head segment remains retained by the mold cavity retainer,
wherein the removable nozzle head segment is a single piece element that retains at least two nozzle tips that extend at least partially outside an outer surface of the nozzle head segment, wherein each nozzle tip is surrounded by a nozzle seal element, wherein the sliding connector element provides for an axial movement along the first axis of the nozzle head segment relative to the nozzle flange segment, wherein the nozzle head segment is configured to be locked via the at least two nozzle tips into at least two mold gates, wherein each injection molding cavity is located in a removable molding cavity insert, and wherein the injection molding cavity inserts are arranged in one or more separate groups of injection molding cavity inserts.

14. A hot runner injection molding apparatus according to claim 13, wherein the sliding connector element provides a telescopic connection between the nozzle head segment and the nozzle flange segment.

15. A hot runner injection molding apparatus according to claim 13, wherein the nozzle tips and nozzle seal elements are configured to be locked into mold gate openings, and wherein the nozzle tips are configured to be attached and removed from the nozzle head segment when the nozzle head segment is external to the side gating nozzle.

* * * * *